E. H. GOLD.
CAR HEATING SYSTEM.
APPLICATION FILED JULY 27, 1907.
931,595.
Patented Aug. 17, 1909.
5 SHEETS—SHEET 1.
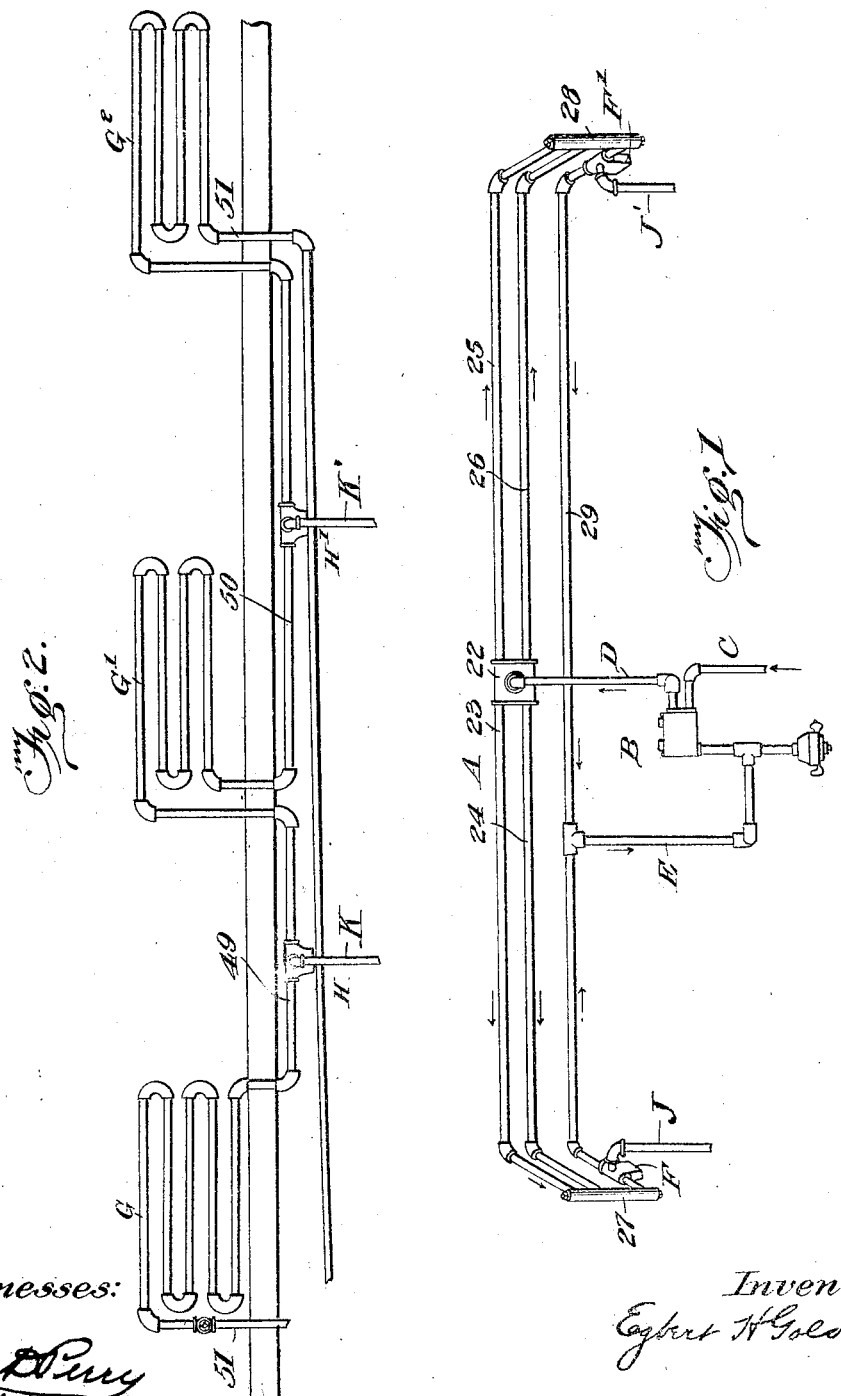
Witnesses:
Inventor:
Egbert H Gold
By O. K. Barnett Atty

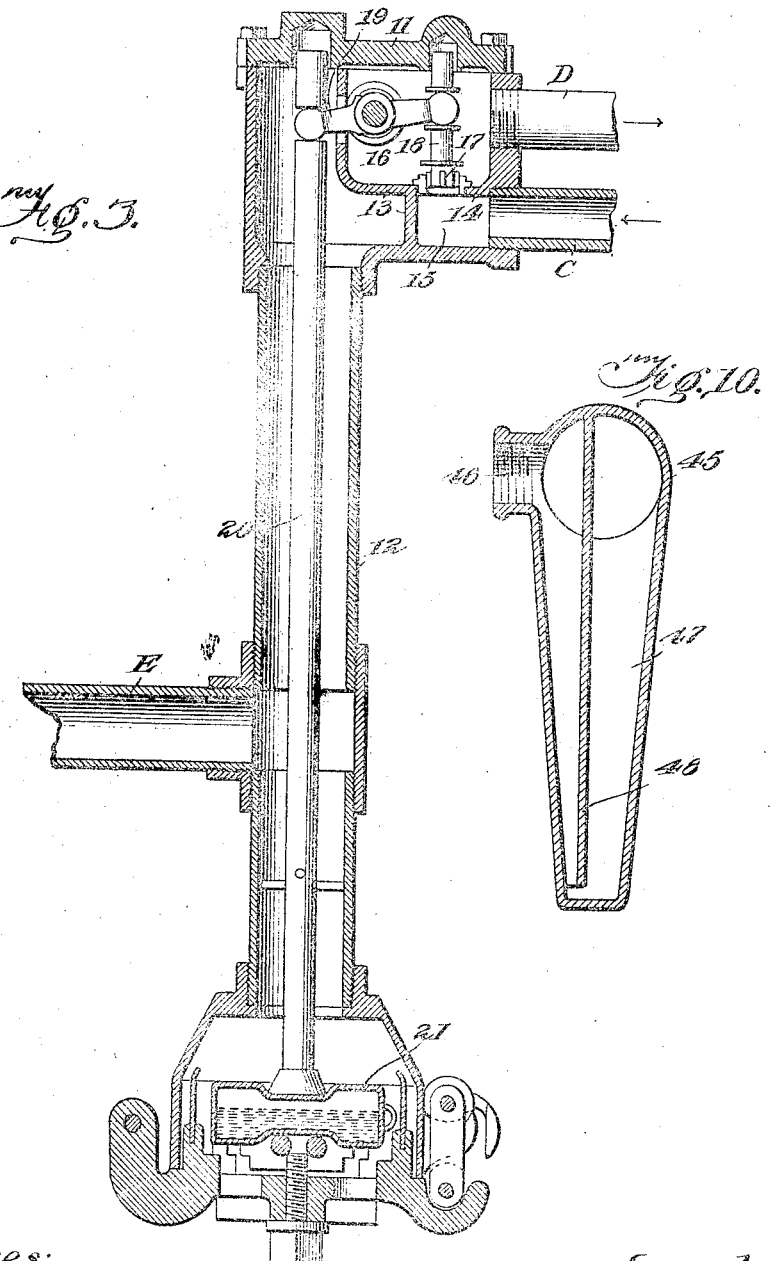

E. H. GOLD.
CAR HEATING SYSTEM.
APPLICATION FILED JULY 27, 1907.

931,595.

Patented Aug. 17, 1909
5 SHEETS—SHEET 3

Witnesses:

Inventor:
Egbert H. Gold

By O. R. Barnett Atty.

E. H. GOLD.
CAR HEATING SYSTEM.
APPLICATION FILED JULY 27, 1907.
931,595.
Patented Aug. 17, 1909.
5 SHEETS—SHEET 4.
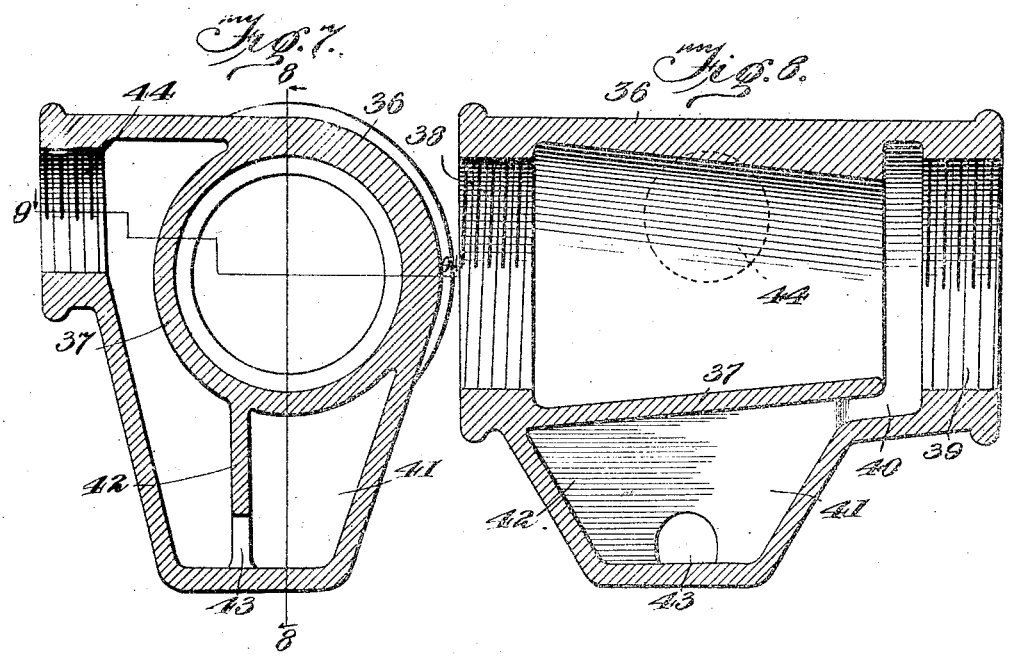
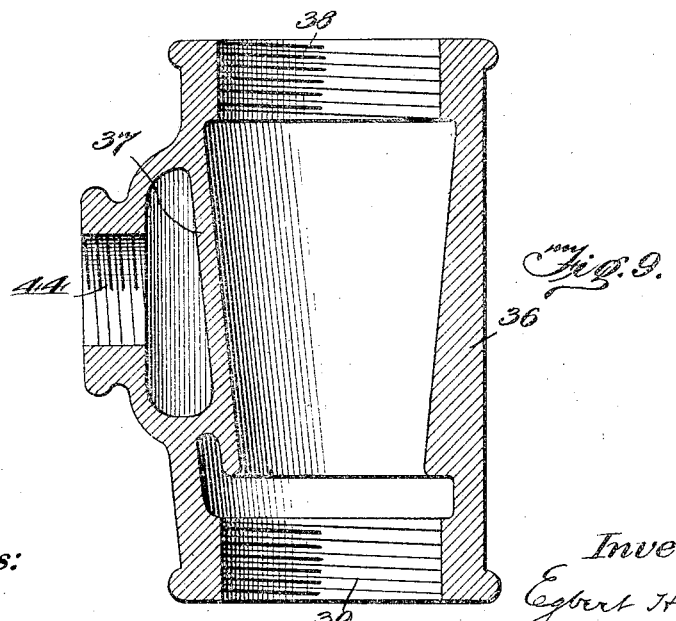
Witnesses:
Inventor
Egbert H Gold
By O. R. Barnett Atty.

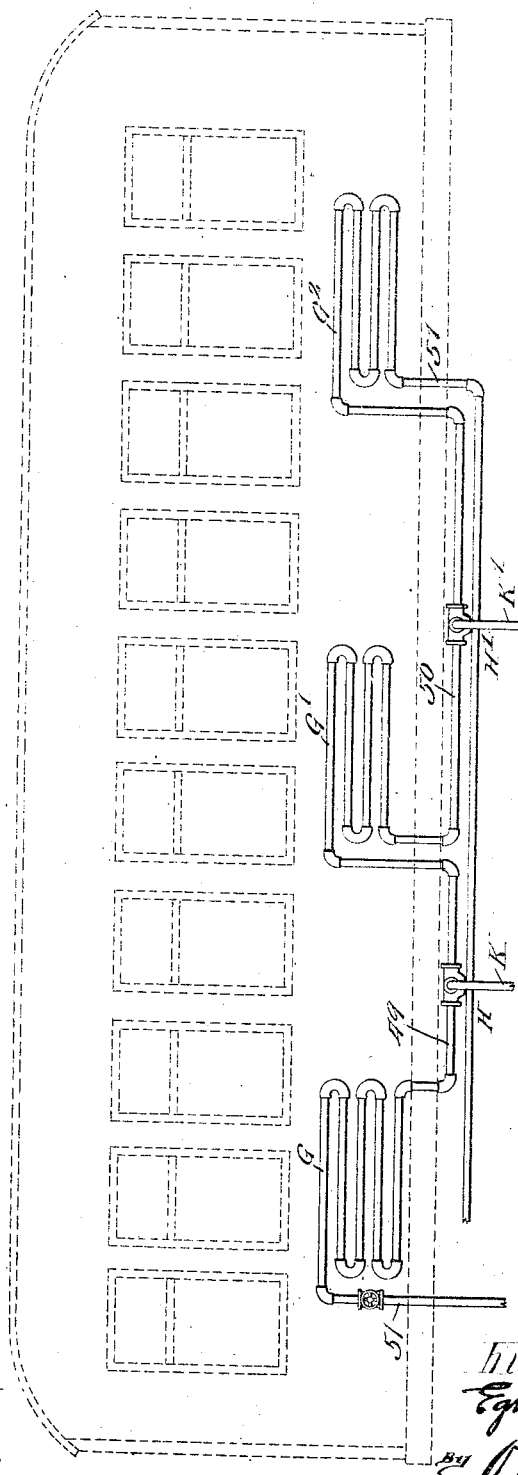

UNITED STATES PATENT OFFICE.

EGBERT H. GOLD, OF CHICAGO, ILLINOIS.

CAR-HEATING SYSTEM.

No. 931,595.　　　　Specification of Letters Patent.　　　Patented Aug. 17, 1909.

Application filed July 27, 1907. Serial No. 385,887.

*To all whom it may concern:*

Be it known that I, EGBERT H. GOLD, a citizen of the United States, residing at Chicago, in the county of Cook and State of Illinois, have invented certain new and useful Improvements in Car-Heating Systems, of which the following is a specification.

My invention relates to steam heating systems and has for its object to provide means for ridding the radiating pipes of such systems of their water of condensation at certain desired points.

The invention is designed to obviate certain defects particularly in railway car heating systems, which defects arise because of the accumulation of water of condensation. For example, when the train is on a grade for some time the water of condensation in the steam coils tends to collect in the lower ends of the coils, hindering the circulation of steam and consequently the proper heating of the car. Also in some well known arrangements the heating pipes are divided into a number of coils placed along the sides of the car and joined at the bottom. The water of condensation collects in the connecting pipes and consequently each of the coils under ordinary conditions has to have its particular inlet and its particular controlling means, in case the system is an automatically regulated one.

By my invention the system of radiating pipes may be freed of water at the low points without permitting the escape of steam and so as to allow automatic control of all the coils as a unit. These embodiments are typical and illustrative merely. The invention may be embodied in railway car heating systems different from those shown or in other heating systems where similar conditions prevail.

Figure 4:
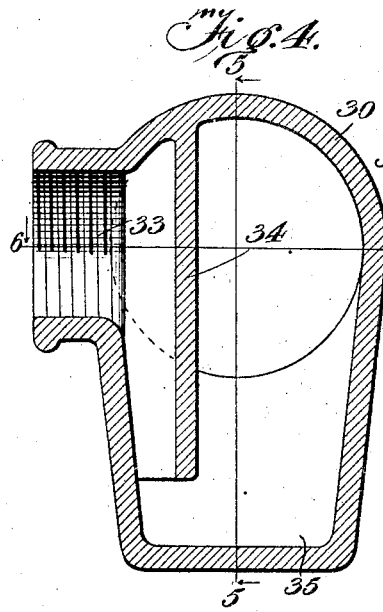
Figure 5:
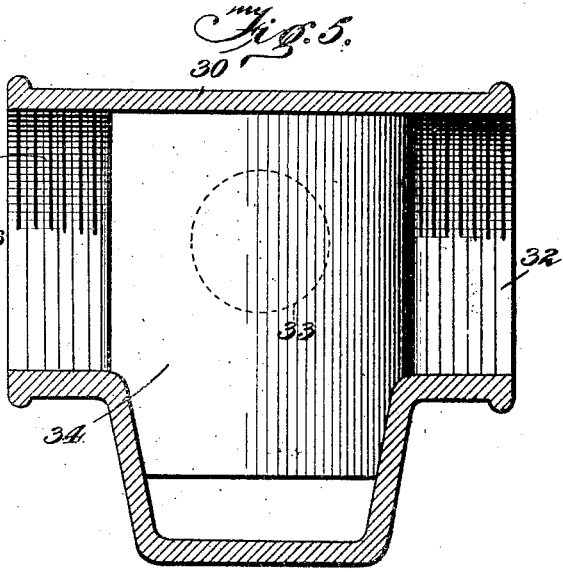
Figure 6:
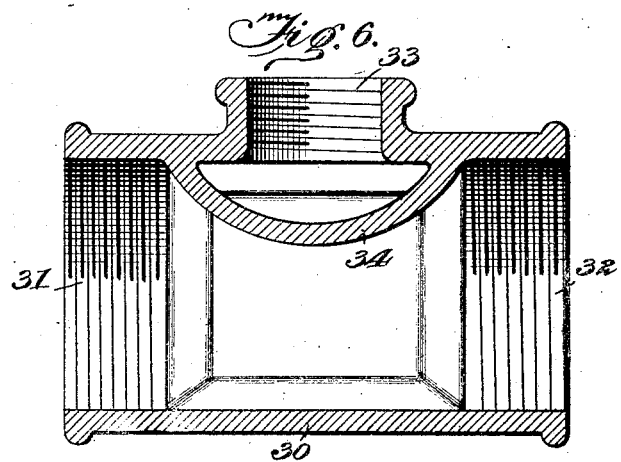

The invention is illustrated in the accompanying drawings, in which:

Figure 1 is a diagrammatic view of a form of heating system with the devices of my invention applied thereto. Fig. 2 is a similar view showing a different arrangement of radiating coils. Fig. 3 is an enlarged sectional view of the controller shown in Fig. 1. Fig. 4 is a vertical section through one form of relief fitting. Figs. 5 and 6 are section on lines 5—5 and 6—6, respectively, of Fig. 4, looking in the direction of the arrows. Fig. 7 is a vertical section through a modified form of fitting. Figs. 8 and 9 are sections on lines 8—8 and 9—9, respectively, of Fig. 7; Fig. 10 is a vertical section through another modification, and Fig. 11 illustrates the arrangement of the heating coils of Fig. 2, in a railway car, the latter being indicated by dotted lines.

Like characters of reference indicate the same parts in the several figures of the drawings.

Referring first to Fig. 1, A represents a coil of pipes, B an automatic controller, C a supply pipe from the train pipe to the controller, D a pipe from the controller to the coil, E a return pipe to the controller, and F, F' relief fittings, such as are shown in detail in Figs. 4 to 6 or 7 to 9.

The controller chosen for purposes of illustration is shown in Fig. 3, and is a well known device, by means of which the steam at the outlet of the radiating coil controls the admission of steam to the coil.

Referring to Fig. 3, 11 is a casing to which is connected a drip pipe 12 and which has the partition 13, the latter, with another partition 14, forming an admission chamber 15 to which pipe C leads, and a valve chamber 16, from which leads the pipe D. These chambers are connected by a port controlled by valve 17 provided with a stem 18, to which is connected a lever 19 pivoted to the casing and engaging a rod 20 extending down the drip pipe to a thermostat 21 at the lower end. This thermostat may be of any desired form. I have shown a sack, partially filled with an easily volatilizable liquid, of ordinary construction. Pipe E leads into the drip 12.

The coil A may be of any desired arrangement. I have shown pipe D leading to a header 22 from which lead pipes 23, 24 on one side and pipes 25, 26 on the other—to respectively connecting pipes 27 and 28— which are connected also by pipe 29 from which leads return pipe E. The coil A may extend the length of the car and the pipes forming it may, of course, be multiplied to any extent.

At the ends of coil A, I place relief fittings F, F'. Figs. 4 to 6 show one form of such fitting, in which 30 is a casing having outlet and inlet ports 31 and 32 and water discharge port 33 and on the interior a partition 34 extending in front of the water discharge port and into a pocket, 35 formed on the lower end of the fitting, but so as to leave a space for escape of water of condensation from the pocket out through discharge port.

A modified form of fitting is shown in Figs. 7 to 9, in which the casing 36 has a curved partition 37 forming a passage-way through from the inlet 38 to outlet 39, a passage-way 40 leading into pocket 41 divided by a partition 42 perforated at 43 to allow passage of water to water outlet 44.

In operation, steam will pass from the train pipe through pipe C to inlet chamber 15, past valve 17, which is assumed to be unseated, out through pipe D to header 22, and thence through pipes 23, 24 and 25, 26 to the connecting pipes 27, 28, and finally back through pipes 29 and E to the drip pipe 12 where, when it has proceeded thus far, it will act upon the thermostat and close valve 17, shutting off the supply of steam to the coil, which, it will be understood, will be opened again as soon as the thermostat cools.

It may well happen in a construction like that described, that the water of condensation, if no provision is made for withdrawing it, may collect at one end or the other of the coil so as to prevent the passage of steam through the pipes; and this is especially likely to happen when the train is running on a long grade. By interposing the fitting F, F' in the coil this is prevented and, furthermore, the system is purged of its water of condensation at points intermediate the inlet and outlet, so that incoming steam is not obliged to do the work of pushing the water the whole length of the coil. A certain amount of water will, of course, collect in pockets 35 or 41 and seal the water outlet so far as steam is concerned, which will continue its course through the fitting and into the adjoining pipes. An excess of water will result in an overflow through the water outlet; the two water outlets indicated by J, J'.

In Fig. 10 another modification is shown, in which a considerable excess of water or pressure of steam is necessary to cause the discharge of water sufficient to allow escape of steam. In this form the casing 45, provided with usual steam inlet and outlet and water outlet 46, is made with an elongated pocket 47, into which extends the elongated partition 48. This form of trap is suitable for use in a system designed to be operated at a pressure higher than atmospheric.

Fig. 2 shows diagrammatically another arrangement of heating coils which is benefitted by the application of my present invention. In this figure G, G', G² represent three vertical coils in the arrangement of radiating pipes ordinarily employed along the walls of a mail or express car, these coils being joined by connecting pipes 49, and 50, and supplied by pipe 51, G² having return pipe 51 which may connect with a controller such as is illustrated in the system first described. Ordinarily it has been necessary in arrangements of this sort to provide a separate supply pipe and separate controlling means for each of the coils, inasmuch as water of condensation would shut off communication between the coils. Following my invention relief fittings H, H' of any of the types shown provided with water outlets K, K', respectively, may be interposed in pipes 49 and 50 so as to trap the water of condensation while permitting the steam free passage through the coils in succession.

I wish it to be understood that I do not desire to be limited to the exact devices, constructions and arrangements shown and described, as obvious modifications will occur to those skilled in this art.

I claim:

1. The combination with a system of radiating pipes open to the atmosphere, of a controlling means for the same, comprising a thermostat located so as to be actuated by steam at the outlet of said system and an inlet valve actuated by said thermostat, whereby the steam in said radiating pipes is maintained at substantially atmospheric pressure and a relief fitting interposed in said system of radiating pipes between portions of the same employed for heating purposes, said fitting comprising a steam passage connecting one of said portions of the system of radiating pipes with the other, and a water outlet to the atmosphere which is at all times open to the outflow of water and is at all times sealed against the escape of steam.

2. The combination with a system of radiating pipes open to the atmosphere, of an inlet valve for the same, a thermostat to control said inlet valve located at the outlet of said system, and a relief fitting interposed in said system of radiating pipes between portions of the same employed for heating purposes, said fitting comprising a steam passage connecting one of said portions of the system of radiating pipes with the other, and an unrestricted water outlet, to the atmosphere which is at all times sealed by water against the escape of steam.

3. The combination with a system of radiating pipes open to the atmosphere, of a relief fitting for ridding said system at an intermediate point, of water of condensation, provided with a water outlet to the atmosphere, so constructed as to be sealed against the escape of steam, and controlling means for controlling the inflow to said radiating pipes, comprising a thermostat actuated by the steam after it has passed through said relief fitting whereby steam is maintained in said radiating pipes at substantially atmospheric pressure.

4. The combination with a system of radiating pipes open to the atmosphere, consisting of a continuous steam conduit, of which one portion is at a lower level than the next succeeding portion, of a relief fitting located in the portion at the low level, provided with a water outlet which is sealed against the escape of steam but is continuously open to the atmosphere for the escape of water of condensation, and a controller for controlling the inflow of steam to said system of radiating pipes, comprising a thermostat under influence of the steam in said conduit beyond said portion on the lower level.

5. The combination with a railway car, of a source of high pressure steam, a radiator in said car running lengthwise thereof, of a relief fitting connected with said radiator between portions of the same which carry steam for heating purposes and located near the end of the car, said fitting comprising a water seal having a constantly open water-outlet to the atmosphere, constructed so that the water seals the same against the escape of steam, an inlet valve to control the inflow to said radiator from the source of high pressure steam, and a controlling device for said inlet valve arranged so as to be under the influence of the steam beyond said relief fitting.

6. The combination with a railway car, of a train pipe carrying steam at high pressure, a radiator located in said car, means comprising a thermostatic device actuated by steam from the radiator for controlling the inflow from the train pipe and circulating it at substantially atmospheric pressure through the radiator, and means located between effective heating portions of said radiator for continuously removing the water of condensation as it accumulates, without permitting the escape of any steam, whereby the control of the steam and its circulation through the radiator at atmospheric pressure is preserved.

EGBERT H. GOLD.

Witnesses:
G. Y. SKINNER,
H. L. PECK.